Oct. 5, 1965 A. P. KRUPER 3,210,617

HIGH GAIN TRANSISTOR COMPRISING DIRECT CONNECTION BETWEEN BASE AND EMITTER ELECTRODES

Filed Jan. 11, 1961

INVENTOR.
ANDREW P. KRUPER
BY
Frederick Shapoe
ATTORNEY

United States Patent Office 3,210,617
Patented Oct. 5, 1965

3,210,617

HIGH GAIN TRANSISTOR COMPRISING DIRECT CONNECTION BETWEEN BASE AND EMITTER ELECTRODES

Andrew P. Kruper, Penn Hills, Pa., assignor to Westinghouse Electric Corporation, East Pittsburgh, Pa., a corporation of Pennsylvania Filed Jan. 11, 1961, Ser. No. 82,020
6 Claims. (Cl. 317—234)

This invention relates to unitary semiconductor devices in which two (or more) transistors are internally cascaded, as in an NPN-NPN or PNP-PNP arrangement, and in particular it concerns such devices modified to characterize them with increased temperature stability.

In the recently filed copending application of Henkels and Nowalk, Serial No. 11,686, filed February 29, 1960, there is disclosed a semiconductor device arranged in such a manner that it functions as an internally cascaded unit of two transistors of the NPN-NPN or PNP-PNP type. That device essentially comprises, in one embodiment, a body of semiconductor material having a large area collector electrode on one major surface and has a plurality of base and emitter electrodes concentrically arranged on the opposing surface. By bridging, shorting or the like, the emitters and bases were so arranged as to cascade the structure into two transistors of the NPN-NPN type (or the reverse). That invention was a marked advance in the semiconductor art and constituted an important advance in molecular engineering applications as well. The present invention is an improvement on the Henkels and Nowalk invention noted, and also constitutes an improvement of general applicability to devices composed of a plurality of internally cascaded transistors.

It is the primary object of the present invention to provide modified structure in unitary semiconductor devices that include a plurality of internally cascaded transistors whereby improved temperature stability is achieved.

It is another object of the invention to provide in a unitary device, cascaded NPN-NPN or PNP-PNP transistors which, in operation, are characterized by improved temperature stability.

These and other objects are attained in accordance with the present invention by providing, in a unitary device that includes a plurality of internally cascaded transistors, a structure that provides a significant resistance between the emitter and base electrodes of the final transistor in the cascade. In one embodiment of the invention, such as in the use of the basic structure of the copending Henkels and Nowalk application, this is accomplished by novel bridging or shorting means. Thus, the base electrode of the first transistor is essentially returned to its emitter electrode through a first significant resistance, the first emitter is joined through a low resistance path to the input or base electrode of the second transistor, and the emitter electrode of the second stage transistor is joined ohmically or by a low resistance path with the third base ring of the overall structure. Functionally, this, with regard to the second transistor, joins the emitter and base of that transistor through a second significant resistance. In this manner, it has been found that the temperature effects on the common emitter current output are sharply minimized, the current remaining stable at widely separated temperature levels. This advantage is achieved without the introduction of any additional part and by the use of techniques now used in the preparation of the prior Henkels and Nowalk device.

The invention will be further described in conjunction with the attached drawing in which.

Figure 1:
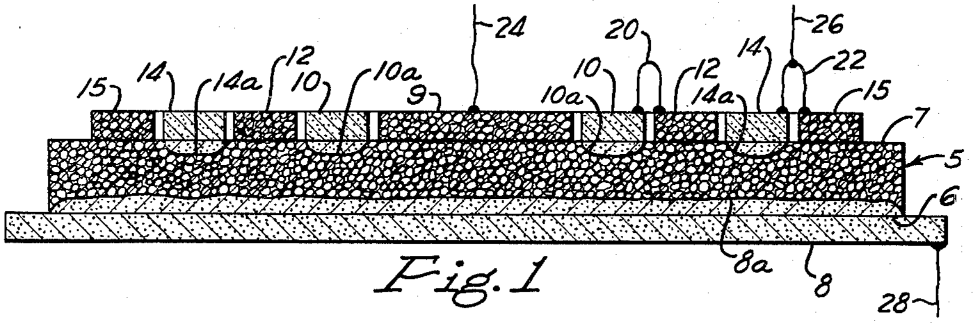
FIG. 1 is a sectional view showing the relative disposition of the various elements as well as indicating the relative conductivity of the several zones in a high gain two stage transistor of this invention.

Referring now to FIG. 1, the numeral 5 indicates a body of semiconductor material containing conductivity determining impurities in a concentration sufficient to characterize the semiconductor as being of one conductivity type. The semiconductor shown is shaped as a thin circular wafer, and accordingly, has opposed major surfaces 6 and 7. On its lower surface 6 is a foil 8 comprising an electrode material containing conductivity determining impurities of a type opposite to those contained in the semiconductor body 5. Electrode 8 is the collector electrode of the transistor device shown; it generally is relatively large to dissipate the large amount of heat developed as a consequence of the high currents involved in some uses of the device. The electrode and semiconductor body are fused together; accordingly, a P-N junction 8*a* is produced in the semiconductor material adjacent the electrode foil 8, because the fusion of the foil produces a zone in the semiconductor body of opposite conductivity type.

On the upper surface 7 of the semiconductor body 5 is a first base electrode 9 composed of an electrode material that is doped with a conductivity determining impurity of the type that determines the conductivity of the semiconductor material 5. Annularly spaced about the base electrode 9 is a ring-shaped first emitter electrode 10, composed of an electrode material that is doped with conductivity determining impurities opposite that of the semiconductor body 5.

A second base electrode 12, ring-shaped, is spaced about the first emitter electrode, and a second emitter electrode 14 is annularly disposed with respect to base 12. Finally, a third base electrode 15, ring-shaped, is on surface 7 about the second emitter electrode 14. The second and third base electrodes are doped with conductivity determining impurities of the same type as the semiconductor 5 while the emitter electrodes are doped with the opposite type conductivity determining impurities. The emitter electrodes are in broad-area rectifying contact with the semiconductor 5, while the base electrodes are in non-rectifying or ohmic contact with that body. Accordingly, second and third P-N junctions 10*a* and 14*a* are provided in semiconductor body 5 under the emitter electrodes 10 and 14, respectively.

A bridge conductor 20 extends from the first emitter electrode 10 to the first ring-shaped base electrode 12, and is in ohmic contact with each. A second bridge conductor 22 extends from the second emitter electrode 14 to the second ring-shaped base electrode 15, and is in ohmic contact with each. An input lead 24 to the first base electrode 9, an emitter lead 26, and a collector electrode lead 28 complete the elements of the device.

Figure 2:
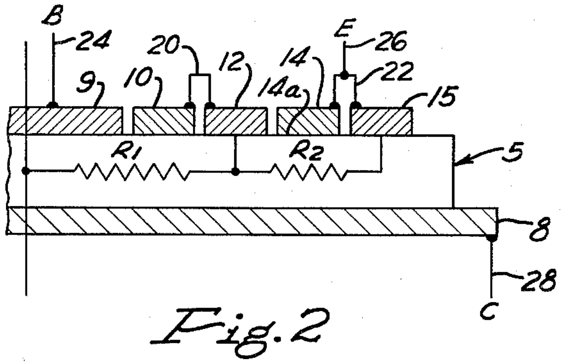
FIG. 2 is a partial side view, in elevation, of the structure of FIG. 1 showing the function of the semiconductor body as a consequence of the application of this invention.
Figure 3:
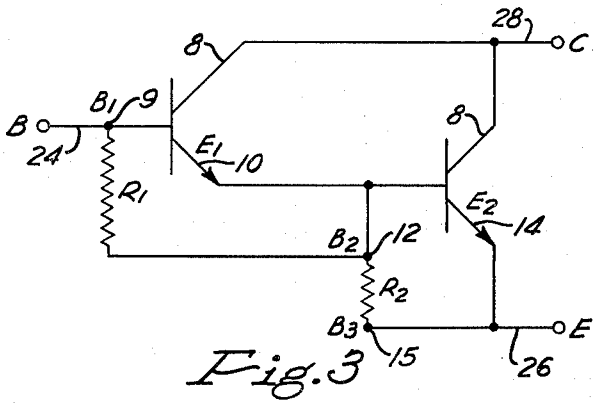
FIG. 3 is the equivalent diagram of the device of FIG. 1.

Referring to FIGS. 2 and 3, it will be observed that the ohmic connection of emitter 14 to base 15 effectively ties the base 12 or input of the second transistor to its emitter 14 through the body 5 of the semiconductor material under the emitter junction 14*a*, that path being identified as $R_2$ in FIGS. 2 and 3. This is a significant resistance, ranging from about 800 to 1500 ohms for units of the type described in the specific example given hereinafter. Functionally, this prevents amplification of collector leakage current in the second stage transistor, and the collector output current remains substantially stable over a wide voltage range and at different temperature levels. The equivalent diagram of the device is shown in FIG. 3.

Semiconductor devices of this invention can be prepared in the same manner as the devices of the noted Henkels and Nowalk application. That is, separate base and emitter rings and collector electrodes can be pre-cut and all are then fused to a semiconductor wafer, such as a P or N type silicon crystal, by conventional techniques. If desired, the junctions can be provided by other techniques which are available. By suitable masking and coating techniques, junctions can be produced in the preselected zones of a crystal by diffusion. Thereafter, metallized surfaces can be provided simply by evaporating a metal, e.g. aluminum, in place on the resulting devices where leads or bridges are to be provided. Where it is desired to avoid bridging, that can be done simply by placing the appropriate electrodes so close during manufacture that they short upon fusion.

The invention will be described further in conjunction with the following specific example in which the details are given by way of illustration and not by way of limitation.

A specific example of a transistor that is structurally in accord with that shown in FIG. 1 was made as follows: The collector, emitter and base electrodes as well as all other electrodes were made from foils 0.0015 inch thick. The collector foil was generally circular and had a diameter of 0.551 in. The silicon wafer used was boron doped and therefore P-type; its characteristics were a (111) orientation, a 50 to 150 ohm-cm. resistivity and a 200 microseconds lifetime. The silicon wafer was 0.0043 inch thick and had a diameter of 0.500 inch. The first base electrode was circular and had a diameter of 0.110 inch. The first emitter electrode had an inside diameter of 0.119 inch and an outside diameter of 0.188 inch. The first ring-shaped base electrode had an inside diameter of 0.197 inch and an outside diameter of 0.276 inch. The second emitter electrode had an inside diameter of 0.285 inch and an outside diameter of 0.363 inch. The second ring-shaped base electrode had an inside diameter of 0.372 inch and an outside diameter of 0.449 inch. All base electrodes were nominally composed of 0.3 weight percent of boron and the remainder gold, while the collector and two emitter electrodes had a nominal composition of 0.6 percent of antimony and the remainder gold. The electrodes were fused to the silicon wafer by heating the sandwich at about 700° C. and holding at temperature for about two minutes whereupon the sandwich was permitted to cool to room temperature. The bridge between emitter 10 and base 12, as well that between emitter 14 and base 15, is made by brazing gold plated silver bridges thereto at about 400° C. Leads are provided in nonrectifying contact to base 9, to the bridge of emitter 14 and 15, and to the collector electrode 8 by conventional welding, thermocompression bonding or the like.

To test devices of this invention, standard units of the Henkels and Nowalk type having leads terminating in pins rather than being bridged, were used. These units were converted to the present invention by joining the leads from the emitter electrode 10 to that of base electrode 12 and joining the lead from emitter electrode 14 to that of base electrode 15. Then the resulting devices were subjected to conventional tests and the collector electrode current output was measured at voltages from 10 to 100 volts and at 25° C. and 100° C. For comparison purposes, there are included data on a device bridged as in Henkels and Nowalk, but otherwise identical to the present device. The data are:

| | Present Invention (ma.) | Conventional Device (ma.) |
|---|---|---|
| $I_{CEO\ 25° C.}$ $V_{CEO}$= 10V | <.1 | <.1 |
| 20V | <.1 | <.1 |
| 30V | <.1 | <.1 |
| 40V | <.1 | <.1 |
| 50V | <.1 | <.1 |
| 60V | <.1 | <.1 |
| 70V | <.1 | <.1 |
| 80V | <.1 | 1.2 |
| 90V | <.1 | 4.0 |
| 100V | <.1 | 9.0 |
| $I_{CEO\ 100° C.}$ $V_{CEO}$=10V | <1 | 5 |
| 20V | <1 | 13 |
| 30V | <1 | 21 |
| 40V | <1 | 30 |
| 50V | <1 | 42 |
| 60V | <1 | 56 |
| 70V | <1 | 70 |
| 80V | <1 | 90 |
| 90V | 1 | 100 |
| 100V | 1 | |

From these data, it is evident that the present invention markedly stabilizes the collector electrode current over the great voltage range tested and this was accomplished at both temperature levels at which tests were conducted. A particular advantage of this invention is evident upon consideration of the fact that the structure with these outstanding results in produced without the addition of any element or without material change in the production cycle.

It will be appreciated that changes can be made in the invention as described without departing from its scope. Semiconductor materials other than silicon, for example germanium or the compound materials such as silicon carbide or the like, can be used as well as conductivity determining impurities other than those shown. Similarly, comb-like or rectangular shapes could be used as well as the ring-type structure shown, noting that the electrodes in the second or third transistors are larger than those of earlier stages to carry the larger currents. The various electrodes and bridges have functional duties as noted, and it is therefore evident that these elements can be produced by diffusion techniques through suitable masks as well as in the manner of the example.

The semiconductor devices of this invention can be used in the same manner and for the same purposes as the high gain power transistor of Henkels and Nowalk. That is, they can be used in such applications as high fidelity record players, in television voice circuits and similar applications where high gain and temperature stability are desired.

The resistance $R_2$ is the critical element in the present invention. If the device comprises three or more cascaded transistor components, $R_2$ will be the resistance between the final base ring and the final emitter. The resistance $R_1$ will be somewhat comparable in value to $R_2$. The actual resistance of $R_1$ and $R_2$ will be determined by the bulk resistivity of the wafer 5, the thickness of wafer 5, and the distance separating base electrode 12 from base electrode 9, and base electrode 15 from base electrode 12. Thus the distance from the periphery of base electrode 9 to the inner diameter of base electrode 12 will be a factor in establishing resistance $R_1$, while the distance from the outer diameter of base electrode 12 to the inner diameter of base electrode 15 will be a factor establishing resistance $R_2$.

The specific resistance of $R_2$ may vary from several ohms or less to several thousand ohms, for instance, 5000 ohms. In devices comparable to those disclosed here, made from a wafer of germanium, $R_2$ may have a resistance of from 2 to 5 ohms and good results are obtained.

While the device specifically described employed a P-type silicon wafer, N-type silicon can be used in practicing the invention.

In accordance with the provisions of the patent statutes, the present invention has been illustrated and described with what is now conceived to represent its best embodiment. However, it should be understood that the invention can be practiced otherwise than as specifically described and illustrated.

I claim as my invention:

1. A transistor device comprising a body of semiconductor material of one conductivity type having opposed major surfaces, a single, solid large area collector electrode containing opposite type conductivity determining impurities fused to one of said major surfaces and producing in said body a fused P-N junction, a first base electrode fused in non-rectifying contact with the other of said major surfaces of said semiconductor body, a first ring-shaped emitter electrode containing opposite type conductivity determining impurities spaced from and surrounding said first base electrode and fused to and producing in said body a P-N junction, a first ring-shaped base electrode spaced about said first emitter electrode and fused to said semiconductor body in non-rectifying contact, a second ring-shaped emitter electrode containing opposite type conductivity determining impurities spaced about said first ring-shaped base electrode and fused to said semiconductor body and producing in said body a P-N junction, a second ring-shaped base electrode spaced from and surrounding the second emitter electrode and fused to the semiconductor body in non-rectifying contact, a first low resistance path free from rectifying junctions electrically joining said first emitter electrode to said first ring-shaped base electrode, a second low resistance path free from rectifying junctions electrically joining the second emitter electrode and the second ring-shaped base electrode, an input lead connected to said first base electrode, a collector lead connected to said collector electrode and an output lead connected to said second low resistance path for providing high gain transistor operation with improved temperature stability.

2. A semiconductor device comprising a body of semiconductor material of one conductivity type having opposed major surfaces, an opposite conductivity type single solid large area collector electrode on one of said major surfaces and producing in said body a P-N junction, a first base electrode in non-rectifying contact with the other of said major surfaces of said semiconductor body, a first ring-shaped opposite conductivity type emitter electrode spaced from and surrounding said first base electrode and producing in said body a P-N junction, a first ring-shaped base electrode about said first emitter electrode and in non-rectifying contact with the semiconductor body, a second ring-shaped opposite conductivity type emitter electrode spaced about the first ring-shaped base electrode and producing in said body a P-N junction, a second ring-shaped base electrode about the second emitter electrode and in non-rectifying contact with the semiconductor body, a first low resistance current carrying path free from rectifying junctions joining the first emitter electrode to the first ring-shaped base electrode, and a second low resistance current carrying path free from rectifying junctions joining the second emitter electrode and the second ring-shaped base electrode, an input lead connected to said first base electrode, a collector lead connected to said collector electrode and an output lead connected to said second low resistance path for providing high gain transistor operation with improved temperature stability.

3. A semiconductor device comprising a body of semiconductor of one conductivity type having opposed major surfaces, an opposite conductivity type single, solid large area collector electrode on one of said major surfaces and producing in said body a first P-N junction, a first base electrode in non-rectifying contact with the other of said major surfaces of the semiconductor body, a first emitter electrode in rectifying contact with said other major surface and spaced from the first base electrode, a second base electrode in non-rectifying contact with said other major surface spaced from the first base electrode by the first emitter electrode, a second emitter electrode in rectifying contact with said other of said major surfaces spaced from the first emitter electrode by the second base electrode, a third base electrode in non-rectifying contact with said other surface spaced from the second base electrode by the second emitter electrode, a first low resistance current carrying path free from rectifying junctions joining the first emitter and second base electrodes, and a second low resistance current carrying path free from rectifying junctions joining the second emitter and third base electrodes, a first external lead electrically connected to said first base electrode, a second external lead electrically connected to said collector electrode, a third external lead electrically connected to said second low resistance path, said first low resistance path being free of external leads forming a multi-stage transistor amplifier with a significant resistance between the emitter and base electrodes of each stage.

4. In a semiconductor device comprising a body of semiconductor material having a single, solid large area collector electrode and a plurality of base and emitter electrodes internally cascaded into at least two transistors, the improvement comprising, a conductive connection joining each emitter electrode of said cascaded transistors to an adjacent one of said plurality of base electrodes.

5. In a semiconductor device of the type wherein a plurality of transistor stages are cascaded to provide high gain having a structure comprising a collector, a plurality of base electrodes and a plurality of emitters, all of which are in contact with a single body of semiconductive material, with said emitters and said base electrodes being alternately disposed and with electrical connections from the emitter of a transistor stage to the base electrode of the succeeding transistor stage in order to cascade said stages, the improvement comprising: an additional base electrode adjacent to the emitter of the final one of said transistor stages, that is in addition to the base electrode of said final transistor stage connected with the emitter of the preceding transistor stage, and a direct electrical connection between the emitter of said final transistor stage and said additional base electrode to provide a significant resistance for enhanced thermal stability in said final transistor stage.

6. In a semiconductor device, the structure and improvement set forth in claim 5 further comprising: an external electrical lead connected to said direct electrical connection between said emitter of said final stage and said additional base electrode, said lead serving as the emitter lead of said device.

References Cited by the Examiner

UNITED STATES PATENTS

| | | | |
|---|---|---|---|
| 2,866,017 | 12/58 | Jones | 330—25 |
| 2,923,870 | 2/60 | Zelinka | 317—235 |
| 2,924,760 | 2/60 | Herlet | 317—235 |
| 2,953,730 | 9/60 | Pantchechnikoff | 317—235 |
| 2,985,804 | 5/61 | Buie | 317—235 |
| 3,042,875 | 7/62 | Higginbotham | 330—25 |
| 3,046,405 | 7/62 | Emeis | 317—235 |

JOHN W. HUCKERT, *Primary Examiner.*

SAMUEL BERNSTEIN, JAMES D. KALLAM, DAVID J. GALVIN, *Examiners.*